United States Patent Office 3,482,014
Patented Dec. 2, 1969

3,482,014
ORALLY ACTIVE HEPARIN AND METHOD FOR MAKING AND USING SAME
Teow Yan Koh, Toronto, Ontario, Canada, assignor to Canada Packers Limited, Toronto, Ontario, Canada
No Drawing. Filed June 29, 1966, Ser. No. 561,346
Int. Cl. A61k 17/18
U.S. Cl. 424—16                                   4 Claims

ABSTRACT OF THE DISCLOSURE

Acid salts of heparin, in contrast to the known neutral salts of heparin, are found to be absorbable through the walls of the intestinal tract to provide effective anticoagulant activity in the blood stream. The acid salts, such as sodium acid heparinate, may be orally administered as enteric pills or tablets.

---

The present invention relates to orally active heparin and, more particularly, to the discovery that heparinic acid and its acid salts are absorbable per se into the blood stream from the intestinal tract to produce an effective anticoagulant activity. It also relates to new heparin products and to methods for administration of heparin whereby it is absorbable through the walls of the intestinal tract with or without the use of adjuvants.

There is some dispute as to the exact structure of the heparin molecule, but it is recognized as being a substance of high molecular weight composed of sulfated, regularly recurring units of hexosamine and hexuronic acid residues. In heparinic acid, itself, each tetrasaccharide unit contains two carboxyl and five sulfate groups.

The normal form of heparin for therapeutic use as an anticoagulant is the neutral sodium salt, designated as sodium heparinate, in which all seven of the available sites are occupied by a sodium atom. This salt is stable for long periods of time, but its use is limited by the need to administer it parenterally, since it is not active, per se, by the oral route. After heparin injections, systemic anticoagulant activity disappears at a rapid rate. therefore, repeated intravenous injections are large subcutaneous injections are required to maintain a therapeutic level of anticoagulant activity in the blood. Repeated injections, besides being inconvenient, also give rise to an irregular level of anticoagulant activity.

An object of the present invention is to provide new procedures and products for oral administration of heparin.

Another object of the invention is to provide forms of heparin which are themselves absorbable through the walls of the intestinal tract to produce therapeutic levels of heparin in the blood.

Another object of the invention is to provide methods for producing novel acid salts of heparin, which are absorbable through the walls of the intestinal tract.

A further object of the invention is to provide therapeutic compositions, for oral administration and passage through the stomach into the intestine, containing forms of heparin which are absorbable per se through the walls of the intestinal tract.

Yet another object of the invention is to provide a method for the administration of heparin which is effective both with and without the simultaneous administration of adjuvants.

The present invention resides in the discovery that heparinic acid and its acid salts are absorbable per se through the walls of the intestinal tract to give therapeutic levels of heparin in the blood, that is to say, levels which will at least double the normal blood coagulation time. This is quite unexpected, since the neutral salts cannot be absorbed without the use of adjuvants. Further, the acid salts which contain salt-forming groups within certain limits have useful anticoagulant activity and can be prepared in solid form, which facilitates their formulation into pills or tablets. Representative acid salts of heparinic acid are those of sodium, potassium, lithium and choline. However, it will be understood that the salt-forming cation may be any physiologically acceptable cation.

In general, it has been found that the lesser the amount of the salt-forming cation present, the greater is the degree of absorbability of heparin activity through the intestinal walls. This relationship between anticoagulant activity and cation content was totally unexpected. However, below a certain minimum cation content, the stability of the heparin decreases as the cation content decreases. Heparinic acid and the salt of low cation content are the most active but least stable. They may be used in liquid form as produced. Fortunately, useful absorption characteristics are realized over a relatively wide range of cation contents and with different cations, thereby making it possible to tailor different compositions to meet specific needs. Thus, for certain situations, wherein immediate use of the heparin following preparation is possible, heparinic acid or the more acid salts can be utilized, whereas, for situations requiring longer stability, solid heparin compositions having greater cation content can be provided. Where administration of sodium is undesirable, the cation can be potassium or other cation more compatible with the system of the particular patient.

From the standpoint of absorbability, suitable substances for introduction into the intestinal tract are heparinic acid and its salts in which up to six of the seven available cationic sites in the tetrasaccharide recurring unit composed of hexosamine and hexuronic acid residues are occupied by the salt-forming groups and the remainder hydrogen. Balancing the factors of absorbability, physical form and stability it has been determined that the most suitable salts for pill formation for administration per os are those in which approximately three to six of the seven available cationic sites in the tetrasaccharide unit composed of hexosamine and hexurónic acid residues are occupied by the salt-forming cation and the remainder occupied by hydrogen. For example, sodium acid heparinates containing from approximately 5% to 10% by weight of sodium are quite useful for this purpose. It will be understood that the heparin compounds of the invention must be administered in such a way that they are present in the intestinal tract. Thus, the compounds are prepared in a form capable of passing through the stomach substantially intact and into the intestine for disintegration and heparin absorption.

Acid heparinates which can very readily be administered orally in enteric pill form to provide useful anticoagulant activity are those which exist as solids and have up to six of the available salt forming sites on the molecule occupied by a physiologically acceptable cation.

Heparinic acid and the heparinic acid salts for the purpose of the invention may be prepared by ion exchange methods starting with any available heparin salt, such as, the neutral sodium salt of commerce. For example, the neutral salt in aqueous solution is treated with an appropriate ion exchange resin to produce a solution of heparinic acid which can be introduced as such into the intestinal tract or first may be reacted with a calculated amount of the appropriate base to yield the desired acid salt. Suitable ion exchange resins are commercially available. Different types of ion exchange resins and different techniques may be employed. For example, strongly acidic cationic exchange resins, such as the nuclear sulfonated ion exchange resins described in U.S. Patent No. 2,366,007, may be used in the hydrogen form in excess of the theoretical amount for direct production of heparinic acid from sodium heparinate solution. The acid can be reacted with any desired amount of base to provide a heparinic acid salt with a predetermined cation content. Alternatively, an aqueous solution of neutral heparinate may be contacted with the exact amount of the ion exchange resin calculated to produce the desired acid heparinate. The aqueous phase is then separated from the resin and lyophilized to give a solid product.

Weakly acidic ion exchange resins may be used to remove part of the cation content of the neutral heparin salt to thereby provide an acid salt directly. With the weakly acidic resins the cations attached to the carboxyl groups of the heparin molecule are preferentially removed, leaving the ones attached to the sulfate groups substantially intact.

Anion exchange resins may be utilized to adsorb the heparinic acid ion from a solution of the neutral salt, following which heparinic acid may be recovered by elution of the resin with an acid. It will be apparent that the broad aspects of invention are not limited to any particular method for preparation of the heparinic acid and its acid salts.

Regardless of the method employed, it is to be borne in mind that the carboxyl groups of heparin are weakly acidic, while the sulfuric acid groups are strongly acidic in nature. Thus, in any treatment of aqueous sodium heparinate with the cation exchange resin, it is the sodium attached to the carboxyl groups which is first removed, and in reacting a base with heparinic acid, itself, the salt-forming element first attaches to a sulfate group. The weakly acidic carboxyl groups are largely undissociated, and it has been found that there results quite stable products when the cation content of the salt is such as to theoretically satisfy approximately all of the sulfate groups of the recurring units of the heparin molecule, leaving the carboxyl groups in free acid form.

For example, sodium acid heparinate containing approximately 8.3% Na compares very favorably in stability with the ordinary neutral sodium salt containing 11.6% Na and yet is sufficiently absorbable from the intestinal tract that dosage units of permissible size may be administered orally without adjuvants to effect therapeutic levels of heparin in the blood. Sodium acid heparinate containing lower percentages of sodium are even more highly absorbable, and while they are not as stable in solution or when exposed to moist atmospheres as the salt of 8.3% or more sodium content, the solid forms of the more acid salts are stable when stored under anhydrous conditions. All of the compounds just described are considered to be highly important compounds for the present invention.

Other representative compounds for purposes of this invention are heparinic acid 0.0% Na; sodium acid heparinates of 8.9% Na, 7.4% Na, 6.2% Na and 4.5% Na, respectively; potassium acid heparinates of 10.5% K, 9.9% K and 6.8% K, respectively; lithium acid heparinate of 1.7% Li and 0.8% Li, respectively; and choline acid heparinates of 18.5% choline and 6.9% choline, respectively.

The compounds of the invention are especially useful because of their absorbability through the walls of the intestinal tract. Dosage units for oral administration are provided with an enteric coating which may be of conventional formulation (e.g. the procedure of Remington's Practice of Pharmacy). The compounds may be administered in relatively pure form, but it is to be understood that they may be combined with inert diluents such as starch, sugar, various stearates and carbonates, kaolin. Preferably, the compositions will be tableted, but if desired, dosage units may be provided as enteric-coated capsules, which may contain the effective heparin compound in the form of a solid or as a liquid suspension or solution.

The particular dosage, or range for the dosage, which will be employed in anticoagulant therapy with an acid salt of heparin in accordance with the present invention will vary in accordance with a number of factors but can be readily determined by those skilled in the art with respect to a selected compound and therapeutic need. Thus, the absorbable anticoagulant activity per mg. will vary with the number of available sites of each of the structural units of heparin which are occupied by a salt-forming element. Also it will vary somewhat with the identity of the salt-forming element, itself. Moreover, as is well known, the commercial neutral sodium salt of heparin employed as the starting material in preparing the acid salts of the invention can, itself, vary considerably in anticoagulant activity, depending upon its source.

What is required of an effective therapeutic dosage is that it at least double the normal blood coagulation time of the subject, and with this basic requirement known, a suitable dosage can readily be determined for each individual acid salt. Because oral administration does not have the disadvantages attendant upon parenteral administration, administration can be more frequent to effect a more closely controlled and sustained level of anticoagulant activity in the blood.

The following examples are given as illustrating methods of preparing the acid salts of the invention:

EXAMPLE 1

An aqueous solution of 11.0 g. of neutral sodium heparinate (11.6% Na, 147 U.S.P. anticoagulant u./mg.) was applied to a column containing 60 ml. of a commercial cation exchange resin of intermediate strength in the acid form. The effluent was collected and lyophilized to give, as a white powder, a sodium acid salt of heparin containing 6.2% of sodium and having an anticoagulant activity of about 130 u./mg.

EXAMPLE 2

An aqueous solution of 4.4 g. of neutral sodium heparinate (11.6% Na, 147 U.S.P. anticoagulant u./mg.) was mixed with 60 ml., an excess, of a strongly acidic cation exchange resin in the acid form and contact was maintained for 15 minutes. After separation of the aqueous heparinic acid phase from the resin beads by filtration, it was partially neutralized with NaOH containing 0.36 g. Na and lyophilized. There was obtained a white powdery sodium acid heparinate containing approximately 8.3% sodium and having an anticoagulant activity of about 130 u./mg.

It will be seen from the above examples that the ion exchange method can be carried out by continuous column or in batch operations. Upon exhaustion the ion exchange resin may be regenerated in the usual manner.

EXAMPLE 3

By the procedure of Example 2, starting with neutral sodium heparinate, preparing heparinic acid and partially neutralizing different portions of heparinic acid with appropriate quantities of sodium hydroxide, potassium hydroxide, lithium hydroxide and choline, respectively, the following acid salts are prepared:

Sodium acid heparinate, 8.9% Na
Sodium acid heparinate, 7.4% Na
Sodium acid heparinate, 4.5% Na
Potassium acid heparinate, 10.5% K
Potassium acid heparinate, 9.9% K
Potassium acid heparinate, 6.8% K
Lithium acid heparinate, 1.7% Li
Lithium acid heparinate, 0.8% Li
Choline acid heparinate, 18.5% choline
Choline acid heparinate, 6.9% choline

EXAMPLE 4

Sodium acid heparinate containing 8.3% Na and having a heparin activity of approximately 130 U.S.P. anticoagulant units/mg. prepared by the procedure of Example 2, is compressed into tablets, by known tableting techniques, each containing 120 mg. of the sodium acid heparinate (i.e. about 15,000 anticoagulant units).

The tablets are then provided with a standard enteric coating.

By similar procedure each of the solid acid heparinate salts of potassium, lithium and choline prepared by the procedure of Example 3 are placed in enteric-coated tablet form.

EXAMPLE 5

Six enteric-coated tablets, each containing 75 mg. sodium acid heparinate (108 U.S.P. anticoagulant units/mg. 8.3% Na) were fed to a dog, weighing 8 kg. Blood samples were drawn by venepuncture at intervals after feeding and the clotting time determined by the method of Mayer.

The clotting time was raised to 50% above normal one hour after feeding, with the peak activity of 3 times the normal at 3 hours after feeding. At 4½ hours, the blood clotting time declined to approximately twice the normal. At this point, two more tablets were fed again to the dog. This maintenance dose had the effect of raising the blood clotting time to approximately twice the normal 6¾ hours after the first feeding. The results are shown as follows:

Clotting time (hours after feeding)

| | |
|---|---|
| 0 | 6'48" |
| 1 | 9'12" |
| 2 | 15'05" |
| 3 | 18'23" |
| 4½ | 11'16" |
| 5¾ | 9'48" |
| 6¾ | 11'50" |
| 7¾ | 6'25" |

The effect of the acid forms of heparin on the absorption through the intestinal wall is illustrated by experiments on test animals as follows:

Aqueous solution containing 39,000 U.S.P. anticoagulant units were prepared of each of the following:

Neutral sodium heparinate (11.6% Na)
Sodium acid heparinate (8.9% Na)
Sodium acid heparinate (8.3% Na)
Sodium acid heparinate (7.4% Na)
Sodium acid heparinate (6.2% Na)
Heparinic acid (0.0% Na)
Neutral potassium heparinate (17.6% K)
Potassium acid heparinate (10.5% K)
Potassium acid heparinate (9.9% K)
Potassium acid heparinate (6.8% K)
Neutral lithium heparinate (3.7% Li)
Lithium acid heparinate (1.7% Li)
Lithium acid heparinate (0.8% Li)
Neutral chlorine heparinate (52.8% chloine)
Choline acid heparinate (18.5% chloine)
Choline acid heparinate (6.9% choline)

Rabbits, of either sex, weighing on the average 3 kg. were anesthetized with ether, the abdomen was entered and the ligament of Treitz identified. There was injected directly into the jejunum of each rabbit one of the aqueous solutions described above. At time intervals of 1 hr., 3½ hours and 6 hours after injection, 10 ml. blood samples were withdrawn by cardiac puncture and the clotting time determined by the capillary method of Mayer, J. Lab. Clin. Med., 49, 938 (1957).

The mean clotting time and standard deviation had previously been determined by this same method for 20 rabbits of comparable size and found to be 8'45"±43".

These tests, the results of which are given in the following table, showed that while the neutral salts in each case had no significant effect upon blood clotting time, the acid salts of the invention were absorbed from the intestinal tract to introduce therapeutic levels of heparin in the blood stream:

TABLE.—SYSTEMIC ANTICOAGULANT ACTIVITY IN RABBITS AFTER INTRA-JEJUNAL INJECTION OF NEUTRAL AND ACID HEPARINATES OF SODIUM, POTASSIUM, LITHIUM AND CHOLINE AND HEPARINIC ACID

| | Material Injected Containing 39,000 U.S.P. Anticoagulant Units | Blood Clotting Time Hours After Injection | | | |
|---|---|---|---|---|---|
| | | [1]0 | 1 | 3½ | 6 |
| Test No.: | | | | | |
| 1 | Neutral sodium heparinate (11.6% Na)[2] | 8'45"±43" | 8'30" | 7'40" | 7'30" |
| 2 | Sodium acid heparinate (8.9% Na) | 8'45"±43" | 20'51" | 12'38" | |
| 3 | Sodium acid heparinate (8.3% Na) | 8'45"±43" | 40'33" | 17'51" | |
| 4 | Sodium acid heparinate (7.4% Na) | 8'45"±43" | 51'08" | 21'05" | 11'14" |
| 5 | Sodium acid heparinate (6.2% Na) | 8'45"±43" | 94'24" | 31'50" | 9'10" |
| 6 | Heparinic acid (0.0% Na) | 8'45"±43" | >300' | 78'30" | |
| 7 | Neutral potassium heparinate (17.6% K)[2] | 8'45"±43" | 8'18" | 8'03" | 7'50" |
| 8 | Potassium acid heparinate (10.5% K) | 8'45"±43" | 20'42" | 13'57" | 8'36" |
| 9 | Potassium acid heparinate (9.9% K) | 8'45"±43" | 34'42" | 17'21" | |
| 10 | Potassium acid heparinate (6.8% K) | 8'45"±43" | 98'22" | 36'49" | 8'30" |
| 11 | Neutral lithium heparinate (3.7% Li)[2] | 8'45"±43" | 8'14" | 8'10" | 7'40" |
| 12 | Lithium acid heparinate (1.7% Li) | 8'45"±43" | 37'50" | 16'02" | 8'05" |
| 13 | Lithium acid heparinate (0.8% Li) | 8'45"±43" | 88'30" | 37'48" | 8'16" |
| 14 | Neutral choline heparinate (52.8% choline)[2] | 8'45"±43" | 9'03" | 8'51" | 8'09" |
| 15 | Choline acid heparinate (18.5% choline) | 8'45"±43" | 19'32" | 6'10" | |
| 16 | Choline acid heparinate (6.9% choline) | 8'45"±43" | 47'32" | 18'02" | 9'04" |

[1] Mean and Standard Deviation for 20 rabbits.
[2] Control.

I claim:

1. An enteric coated composition for oral administration in blood anticoagulant therapy comprising an effective anticoagulant dosage of a sodium, potassium, lithium or chlorine acid salt of heparin having in the sulfated regularly recurring tetrasaccharide unit composed of hexosamine and hexuronic acid residues an average of not less than about three nor more than six of the seven available cationic sites occupied by the salt-forming cation and the remainder occupied by hydrogen.

2. The composition of claim 1 wherein the acid salt of heparin is a sodium acid heparinate containing approximately 4.5 to 10% of sodium.

3. The composition of claim 2 wherein the acid salt of heparin is a sodium acid heparinate containing approximately 8.3% of sodium.

4. The composition of claim 1 wherein the acid salt of heparin is a solid sodium acid salt of heparin and the product is in the form of an enteric-coated pill or tablet.

References Cited

UNITED STATES PATENTS

| | | | |
|---|---|---|---|
| 3,065,140 | 11/1962 | Velluz et al. | 167—74 |
| 3,126,320 | 3/1964 | Morii et al. | 167—82 |

(Other references on following page)

UNITED STATES PATENTS

| | | | |
|---|---|---|---|
| 2,656,298 | 10/1953 | Loewe | 424—183 XR |
| 3,062,716 | 11/1962 | Montandraud | 424—183 |
| 3,088,868 | 5/1963 | Windsor | 424—183 XR |
| 3,181,996 | 5/1965 | Bianchini | 424—183 |
| 3,232,833 | 2/1966 | Riviere | 424—183 |
| 3,247,063 | 4/1966 | Pulver | 424—183 |

SHEP K. ROSE, Primary Examiner

U.S. Cl. X.R.

424—183